United States Patent Office 2,929,215
Patented Mar. 22, 1960

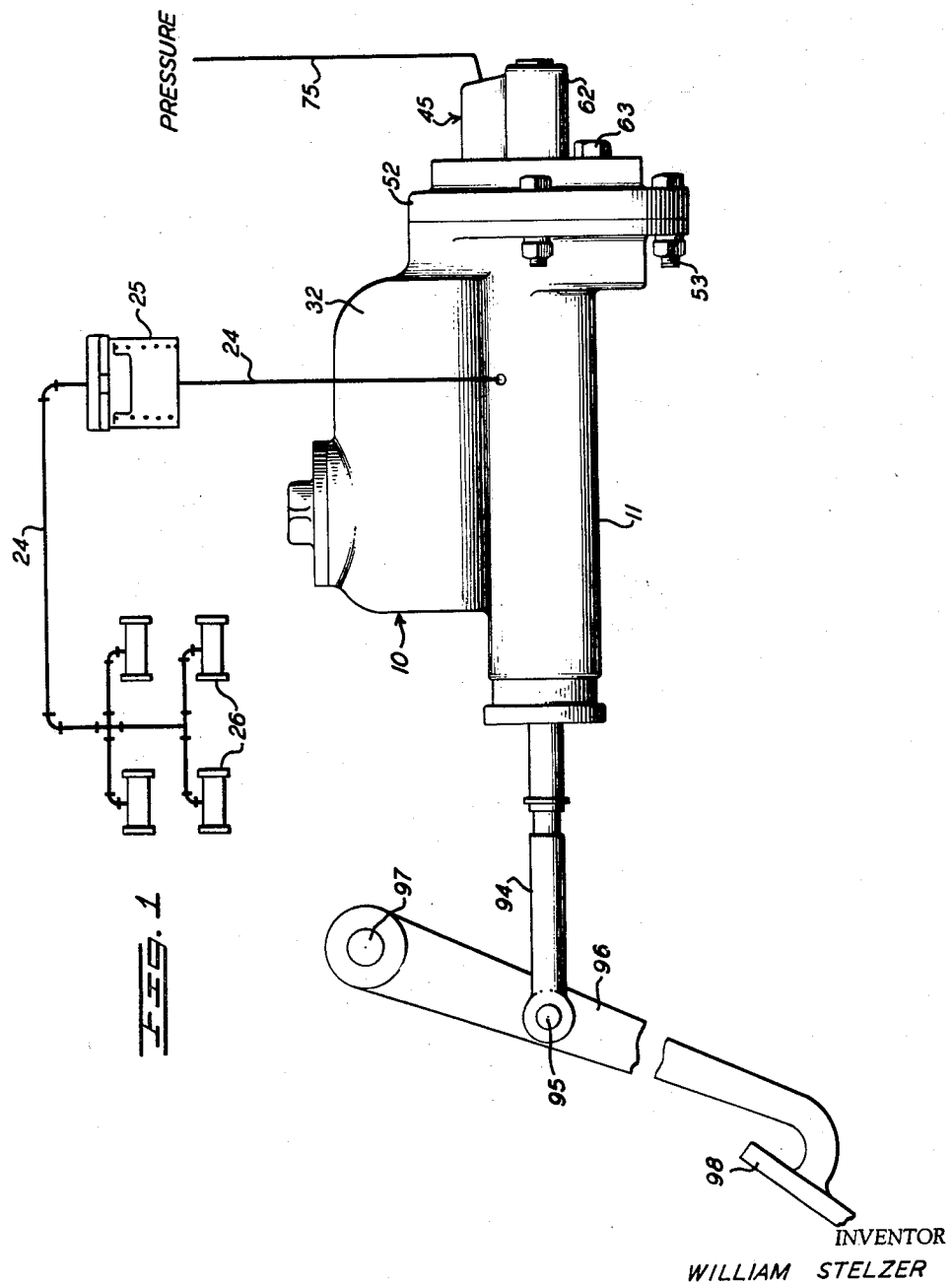

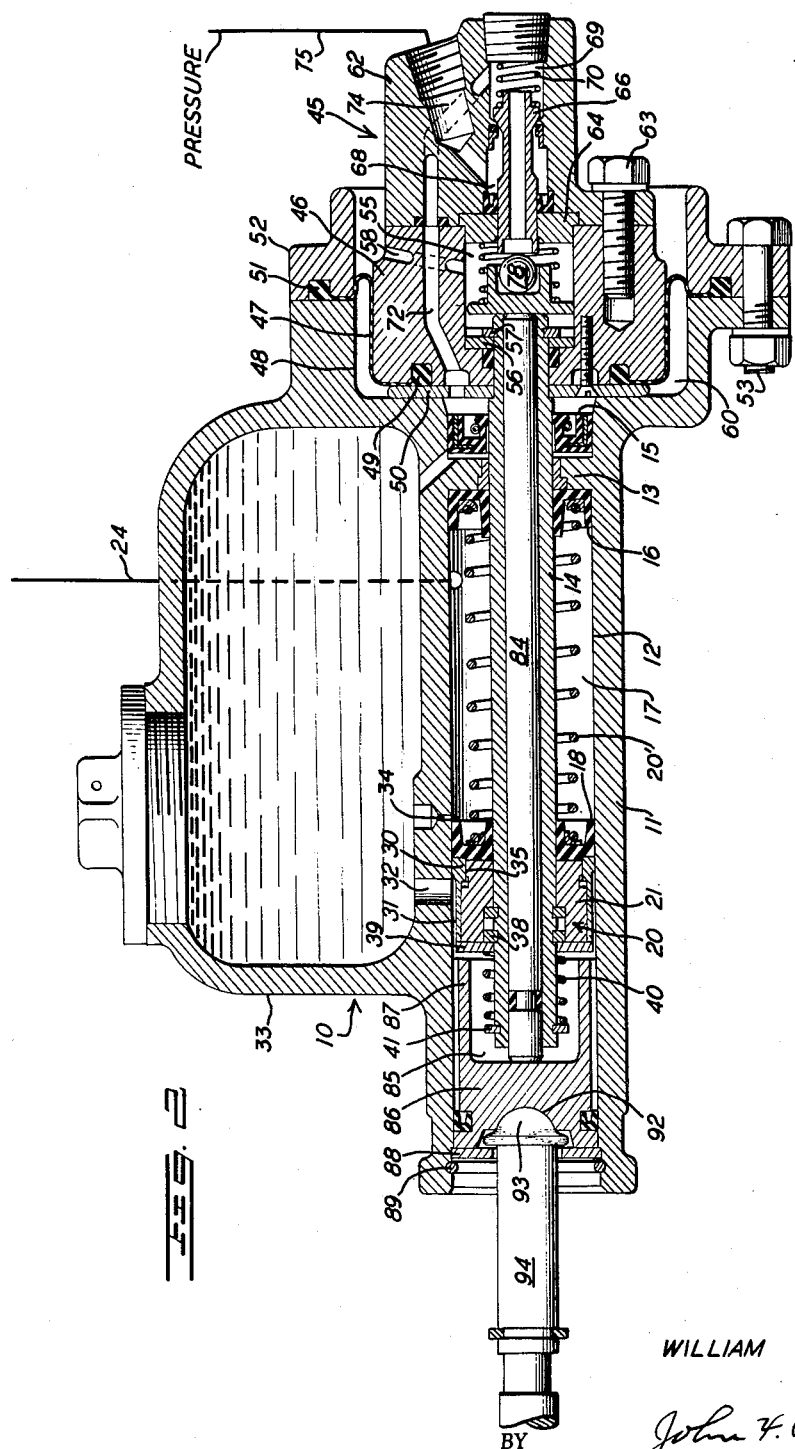

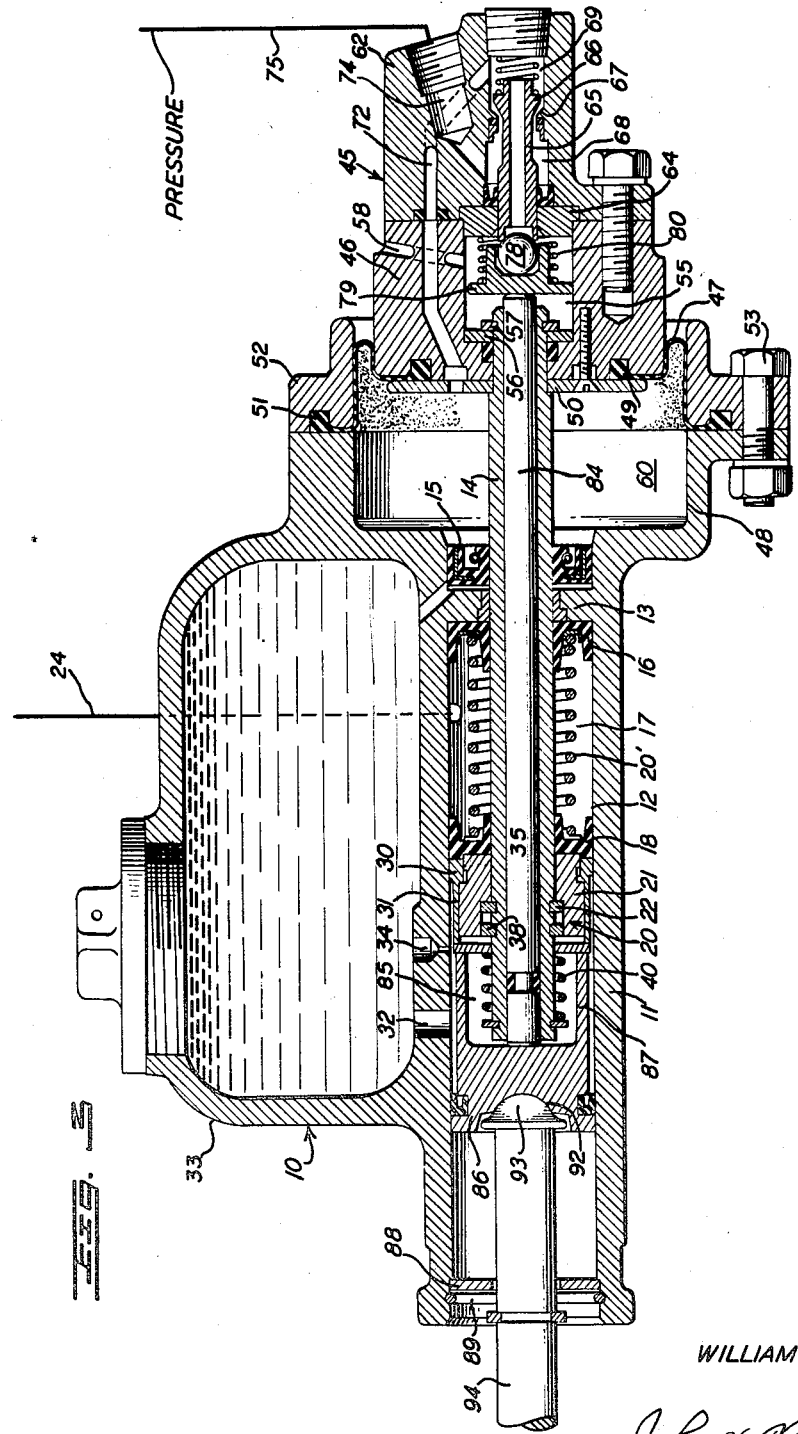

2,929,215

BOOSTER BRAKE MECHANISM

William Stelzer, Bloomfield Hills, Mich., assignor to Kelsey-Hayes Company, Detroit, Mich., a corporation of Delaware Application November 14, 1957, Serial No. 696,535

14 Claims. (Cl. 60—54.6)

This invention relates to a booster brake mechanism.

Motor vehicle booster brake mechanisms are generally either of two types, namely, (1) the type wherein pedal operable master cylinders are connected to the booster motor to utilize fluid displaced from such master cylinder to energize the booster motor, or (2) the type wherein there is direct pedal actuation of the valve mechanism for the motor. The latter type of booster brake mechanism, generally speaking, is the simpler of the two but usually involves certain complications in construction and operation. For example, in booster brake mechanisms of the direct actuation type, it usually is necessary to project through one wall of the booster motor a push rod connected to the brake pedal, and this raises a substantial problem in the sealing of the push rod against leakage and in the friction introduced against movement of the push rod.

An important object of the present invention is to provide a highly compact booster brake mechanism of the direct actuation type wherein the fluid displacing means, the booster motor, and the control valve mechanism therefor are all embodied in a single simplified unit adapted for direct actuation by a pedal operable rod without the necessity of having to project such rod through one wall of the motor.

A further object is to provide such a booster mechanism wherein the results referred to are attained by transmitting a pulling action to the fluid displacing plunger instead of a pushing action as is true in most direct action brake mechanism of this general type, and to combine with such mechanism novel means for transmitting brake pedal movement to the valve mechanism and for transmitting reaction forces to the brake pedal.

A further object is to provide such an apparatus the characteristics of which permit substantial simplicity of the motor and all of the parts of the mechanism and wherein the brake operated push rod is moved with minimum friction, thus providing a highly sensitive booster motor operation.

A further object is to provide such an apparatus wherein problems incident to sealing around the brake operated push rod are eliminated, together with the friction occurring incident to the use of sealing means for this purpose, thus rendering more sensitive the reaction transmitted to the brake pedal.

A further object is to provide such an apparatus wherein the means for transmitting reaction to the brake pedal is embodied directly in the fluid displacing plunger operated by the booster motor.

A further object is to provide a mechanism of this character wherein an initially soft brake pedal is provided, and wherein highly novel means is employed for transmitting to the brake pedal higher direct reactions proportionate to the hydraulic pressures being supplied to the wheel cylinders after the brake shoes engage the drums.

Other objects and advantages of the invention will become apparent during the course of the following description.

In the drawings I have shown one embodiment of the invention. In this showing:

Figure 1 is a side elevation of the booster mechanism and the pedal operating means therefor, certain of the parts being diagrammatically represented;

Figure 2 is an enlarged central longitudinal sectional view through the booster mechanism, the parts being shown in normal off positions; and Figure 3 is a similar view showing the parts in operative positions.

Referring to Figures 2 and 3, the numeral 10 designates a preferably cast body including a master cylinder 11 having a bore 12 therein. This bore is provided at one end with a bearing wall 13 through which is slidable a tubular member 14 sealed with respect to the wall 13 as at 15. For friction reducing purposes, the seal 15 preferably is supplied with fluid from the reservoir to be described, through a suitable passage as shown.

Within the bore 12, the tubular member 14 is further sealed against leakage as at 16. The seal 16 forms one end of a pressure chamber 17, the other end of which is defined by a seal 18 arranged against a fluid displacing unit indicated as a whole by the numeral 20. The fluid displacing unit 20 is biased to off position by a return spring 20' engaging at its ends against the seals 16 and 18.

The unit 20 comprises a plunger 21 fixed with respect to the tubular member 14 by a retaining ring 22 to effect movement of the plunger body 21 to the right of the position shown in Figure 2 upon operation of the motor to be described. Such movement of the unit 20 displaces fluid from the chamber 17 through a line 24 in which is diagrammatically illustrated (Figure 1) a conventional residual pressure valve 25 which, of course, can be embodied at any desired point in the line 24 or may be connected to the body 10. Beyond the residual pressure valve 25, the line 24 leads to the conventional wheel cylinders 26 of the motor vehicle.

A reaction sleeve 30 forms a part of the fluid displacing unit 20 and surrounds the plunger body 21. The sleeve 30 normally occupies the position shown in Figure 2 with its right-hand end projecting slightly beyond the corresponding end of the plunger body 21. Rearwardly of its right-hand end, the sleeve 30 is reduced in diameter as at 31 to provide for the flow to the left around the unit 20 of fluid passing through a port 32 from a reservoir 33 of the conventional type. The body 10 is also provided with a small compensating port 34 communicating with the chamber 17 just ahead of the seal 18 in accordance with conventional practice in the making of master cylinders.

The sleeve 30 is relatively thick at its right-hand end as viewed in Figures 2 and 3 and has the inner surface of such end slidable over the reduced adjacent end 35 of the plunger body 21. The area of such thickened end of the sleeve 30 will determine the reaction ratio transmitted to the brake pedal, as will become more apparent below.

Adjacent the left-hand extremity of the plunger body 21, the tubular member 14 carries a second retaining ring 38 against which seats a plate or washer 39 forming a seat for the adjacent end of a spring 40 surrounding the tubular member 14. The opposite end of this spring engages against a snap ring 41 carried by the tubular member 14.

Force is transmitted to the fluid displacing unit 20 by operation of a motor indicated as a whole by the numeral 45. This motor preferably is of the super-atmospheric pressure type, as will become apparent. The motor comprises a body 46 of circular cross section and over which extends a diaphragm 47, the body 10 being axially recessed as at 48 to receive the diaphragm when the motor is de-energized as shown in Figure 2. At its inner periphery, the diaphragm is provided with a bead 49 maintained in position by a plate 50 secured with respect to the body 46 by a suitable shoulder on the tubular member 14. The diaphragm 49 is provided with an outer peripheral bead 51 maintained in position relative to the body 10 by a cap member 52 secured in position by bolts 53.

The body 46 is provided with an axial chamber 55 in the inner end of which is arranged a retaining plate 56 secured in position relative to the tubular member 14 by a snap ring 57. Thus it will be apparent that the body 46 is securely fixed to the tubular member 14 to transmit movement thereto. The chamber 55 is vented to the atmosphere through a passage 58.

The inner extremity of the recess 48 forms a wall engaged by the plate 50 to limit movement of the reciprocating parts of the motor and associated elements to the left to the position shown in Figure 2. The recess 48 forms with the diaphragm 47 a pressure chamber 60 normally open to the atmosphere as described below and adapted to be connected to a source of super-atmospheric pressure to operate the motor and effect movement of the fluid displacing unit 20.

A cap body 62 is secured to the body 46 as at 63 and anchors in position a wall 64 forming the right-hand limit of the chamber 55. The wall 64 slidably supports for axial movement a tubular valve body 65 sealed with respect to the wall 64, as shown. The right-hand end of the valve body 65 carries a poppet valve 66 engageable with a valve seat 67 to determine communication between a pair of chambers 68 and 69, in the latter of which is arranged a spring 70 to bias the poppet valve 66 to closed position. The chamber 69 is in constant communication through passage means 72 with the motor chamber 60. The chamber 68 communicates through a port 74 with one end of a flexible fluid line 75, preferably in the form of a high pressure hose, connected to a source of super-atmospheric pressure.

The axial opening through the tubular member 65 normally affords communication between the chambers 55 and 69, which communication is adapted to be closed by a ball valve 78 engageable with the adjacent end of the tubular valve body 65 in the manner shown in Figure 3. The ball 78 is preferably carried in a button 79 biased to the off position shown in Figure 2 by a spring 80.

The button 79 is adapted to be operated to move the ball valve 78 to closed position by the transmission of axial movement to a rod 84 projecting entirely through the tubular member 14. This rod normally occupies the position shown in Figure 2, projecting from the left-hand end of the tubular member 14 and engaging in the bottom of a recess 85 formed axially in a control piston 86. The recess 85 surrounds the spring 40 and adjacent elements and forms a sleeve 87 the free end of which is normally spaced from the plate 39. The control piston 86 is biased to the left in Figures 2 and 3 by the spring 80, acting through the rod 84, and normally engages a stop washer 88 fixed against displacement by a snap ring 89.

At its left-hand end, the control piston 86 is provided with a hemispherical recess 92 engaged by a head 93 carried by a push rod 94. This push rod (Figure 1) is pivotally connected as at 95 to a brake pedal 96, preferably of the depending type, pivotally supported at its upper end as at 97 and provided at its lower end with a pedal pad 98.

Operation

The parts normally occupy the positions shown in Figures 1 and 2. The hydraulic chamber 17 communicates with the reservoir 33, but such communication will be immediately cut off upon initial movement to the right of the fluid displacing unit 20. The ball 78 is off its seat and, accordingly, the chamber 55, open to the atmosphere through passage 58, communicates with the motor chamber 60 through the interior of the tubular valve member 65, chamber 69, and passage 72. Therefore the diaphragm 47 will be atmospherically balanced.

When the brakes are to be applied, the operator will press the pedal pad 98, thus moving the push rod 94 to the right as viewed in the drawings. The left-hand end of the rod 84 (Figure 2) engages the control piston 86, which will be moved by the push rod 94, and accordingly the rod 84 will move the member 79 to seat the ball valve 78 to place the valve parts in lap position. The interior of the tubular valve member 65 will now be disconnected from the chamber 55. Further movement of the parts referred to by the push rod 94 will cause the ball valve 78 to move the valve body 65 toward the right to crack the valve 66 from its seat. Super-atmospheric pressure, supplied to the chamber 69 from the flexible line 75, will now flow into the chamber 69 and thence through passage 72 into the motor chamber 60. The diaphragm 47 will then be moved toward the right, carrying with it the body 46, cap member 62, and associated elements. Such motion of the body 46 will be transmitted to the tubular member 14 and the retaining ring 22 will transmit similar movement to the plunger body 21.

The sleeve 30, surrounding the plunger body 21, is biased to its normal position shown in Figure 1 by the spring 40. Initial operation of the motor, therefore, will move not only the plunger body 21 but also the sleeve 30 to the right from the position shown in Figure 2, the control piston 86 following such movement through continued depression of the brake pedal.

Movement of the fluid displacing unit 20 in the manner referred to displaces fluid through line 24 and through the residual pressure valve 25 into the brake cylinders 26 to move the conventional brake shoes into engagement with the drums. As soon as such engagement takes place, it will be apparent that there will be a sudden increase in pressure in the system, this pressure in the hydraulic chamber 17 now being from 40 to 80 p.s.i. Continued operation of the motor, assuming that the operator continues to depress the brake pedal and thus maintains the high pressure air valve 66 off its seat, will continue to effect movement of the fluid displacing unit 20 toward the right. When the predetermined pressure referred to is reached in the hydraulic chamber 17 incident to engagement of the brake shoes with the drums accompanied by the application of braking forces, the increased pressure in the chamber 17, operating against the sealing cup 18, will urge the sleeve 30 to the left of the position shown in Figure 2.

It will be apparent that initial operation of the mechanism in the manner described will move the sleeve portion 87 of the control piston into close proximity to, but not into engagement with, the plate 39. When the increased pressure occurs in the chamber 17 as described, however, displacement of the sleeve 30 to the left of its normal position will cause it to overcome the spring 40, acting on the plate 39, and such plate will be brought into engagement with the sleeve portion 87 as shown in Figure 3. At this point, direct hydraulic reaction will be transmitted from the chamber 17, through the peripheral portion of the sealing cup 18, through the sleeve 30 and plate 39 to the control piston 86, and this reaction obviously will be transmitted through the push rod 94 to the brake pedal. The extent of the reaction, of course, will depend directly upon the pressure in the chamber 17. As this pressure increases incident to heavier application of the brakes, the reaction forces proportionately increase, and such reaction is accurately felt by the operator through the pedal 98. In overcoming such reaction to continue the application of the brakes, of course, the operator will be applying force thorugh the enlarged end of the sleeve 30 and through the sealing cup 18 to the fluid in the chamber 17, and therefore the operator performs a proportionate amount of the work in generating pressures in the chamber 17.

The ratio of the reaction and force applied by the operator will depend upon the ratio between the areas of the right-hand ends of the sleeve 30 and plunger body 21. It is a simple matter of design, of course, to make this ratio whatever may be desired in any particular installation.

The valve mechanism provided a perfect follow-up action of the fluid displacing unit 20 relative to movement of the brake pedal. Whenever the movement of the brake pedal is arrested, a very slight additional movement of the pressure responsive unit of the motor will cause the seat 67 to engage the valve 66, thus cutting off the admission of further super-atmospheric pressure to the motor. Any tendency for the motor to overrun movement of the brake pedal will cause the valve seat 67, acting through the poppet valve 66, to move the tubular valve member 65 slightly to the right, thus cracking the ball valve 78 to relieve around the ball valve 78 any pressure necessary to establish a proper equilibrium of the parts.

All of the parts obviously will return to normal position promptly upon the releasing of the brake pedal. Assisted by the usual return spring (not shown) associated with the brake pedal, the spring 80 will move the rod 84 to the left of the position shown in Figure 3, wholly releasing the ball 78 from the valve body 65, and the spring 70 will return the pressure valve 66 to its seat. The motor chamber 60 thus will be disconnected from the source of pressure and connected to the atmosphere. The return spring 20', of course, will return the fluid displacing unit and parts associated therewith to normal position.

It will be apparent that the present construction places all of the working parts of the apparatus in coaxial relationship, thus not only greatly simplifying installation but maintaining all forces of every kind in coaxial relationship, which is obviously advantageous. Moreover, the construction of the mechanism is such that it is unnecessary to pass through a stationary motor head with the valve operating push rod, thus eliminating the necessity for providing sealing means around the push rod with its accompanying frictional resistance to movement. The seal employed with the control piston 86 is never subjected to high pressure, and accordingly frictional resistance to movement of the control piston 86 is negligible. Also, the rod 84 may fit relatively loosely in the tubular member 14, except for the preferable use of a single seal at the point indicated, and therefore, upon initial operation, substantially the sole resistance encountered by the brake pedal in operating the mechanism will be the relatively light loading of the spring 80, followed by the additional very light loading of the spring 70. It accordingly will be apparent that a soft initial pedal is provided, together with novel means for transmitting direct hydraulic reaction to the brake pedal during actual braking engagement of the shoes with the drums, and this is accomplished in an unusually simple mechanism.

In this connection it may be pointed out that, since the extension of a vlave operating push rod through a motor head is eliminated, valve elements of the type referred to may be employed in coaxial alinement with the push rod and associated elements, and the entire motor structure may be assembled before being connected to the body 10 by the bolts 53. Thus the assembling of the device is greatly facilitated and may be accomplished in a minimum amount of time.

It also will be noted that concentricity problems are reduced to a minimum with the arrangement of parts shown. The body 46 is fixed to the tubular member 14 and is therefore supported, together with the cap member 62, solely by the bearing in the wall 13 for axial movement relative to the cylinder 11, the body 46 being connected to the body 10 solely by the diaphragm 47. Any tendency for the parts to bind accordingly is eliminated.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism comprising a cylinder having an outlet for connection with the wheel cylinders of a motor vehicle, a fluid displacing unit in said cylinder movable to displace hydraulic fluid therefrom, said fluid displacing unit comprising a body and a reaction member carried thereby and movable axially relative to said body, a fluid pressure motor at one end of said cylinder having a pressure responsive unit connected to said body, said motor comprising a pressure chamber and a valve mechanism controlling communication between said chamber and sources of relatively high and low pressures and normally connecting it to said source of low pressure, valve actuating means at the other end of said cylinder having mechanical connection with said valve mechanism to move it to connect said chamber to said source of high pressure to activate said motor, said reaction member having one end forming a part of the area of said fluid displacing unit exposed to pressure in said cylinder, and means mechanically connected to and biasing said reaction member to a normal position relative to said body from which position said reaction member is movable by pressures in said cylinder, said valve actuating means having lost motion connection with said reaction member, which is taken up upon movement of said reaction member incident to a predetermined increase in pressure in said cylinder to oppose valve actuating movement of said valve actuating means.

2. A booster brake mechanism comprising a cylinder having a wall at one end, a fluid displacing unit slidable in said cylinder and forming with said cylinder and with said end wall a hydraulic chamber communicating with the wheel cylinders of a motor vehicle, said fluid displacing unit comprising a body and a reaction member carried thereby and axially movable relative to said body, said reaction member having one end exposed to said hydraulic chamber to be moved by pressure therein; a fluid pressure motor arranged at said end of said cylinder and comprising a pressure responsive unit, a variable pressure chamber and a valve mechanism controlling communication between said variable pressure chamber and sources of relatively high and low pressures and normally connecting said variable pressure chamber to said source of low pressure, an axially movable sleeve connected between said pressure responsive unit and said body and slidable through said wall, means mechanically connected to and biasing said reaction member toward said hydraulic chamber to a normal position relative to said body, and valve actuating means having mechanical connection with said valve mechanism to operate it to connect said variable pressure chamber to said high pressure source, said valve actuating means having a portion spaced from said reaction member when the latter is in said normal position and mechanically engageable therewith when pressure in said hydraulic chamber increases to a predetermined point to oppose movement of said valve actuating means.

3. A mechanism according to claim 2 wherein said valve actuating means comprises a control member slidable in the other end of said cylinder, a rod slidable through said sleeve and engaging at opposite ends against said control member and against said valve mechanism whereby movement of said control member toward said one end of said cylinder will move said rod to operate said valve mechanism, said control member constituting that portion of said valve operating means spaced from said reaction member when the latter is in said normal position to be engaged thereby when pressure in said hydraulic chamber increases to said predetermined point, 4. A mechanism according to claim 2 provided with a seal surrounding said sleeve and engaging said cylinder and the adjacent ends of said body and said reaction member and deformable under pressures in said hydraulic chamber to effect movement of said reaction member from said normal position.

5. A mechanism according to claim 2 wherein said sleeve projects through and beyond the end of said body remote from said hydraulic chamber, and a plate normally arranged against said end of said body and engaging said reaction member, said biasing means comprising a spring surrounding said projecting end of said sleeve and acting between said end of said sleeve and said plate to tend to maintain said reaction member in said normal position.

6. A mechanism according to claim 2 wherein said sleeve projects through and beyond the end of said body remote from said hydraulic chamber, a plate normally arranged against said end of said body and engaging said reaction member, said biasing means comprising a spring surrounding said projecting end of said sleeve and acting between said end of said sleeve and said plate to tend to maintain said reaction member in said normal position, and a seal in said hydraulic chamber surrounding said sleeve and slidable in said cylinder and engaging the adjacent ends of said body and said reaction member, said seal being deformable when pressure in said hydraulic chamber exceeds the loading of said spring to move said reaction member and transmit reaction forces to said valve operating means.

7. A booster brake mechanism comprising a cylinder having a wall at one end, a fluid displacing unit slidable in said cylinder forming with said cylinder and with said end wall a hydraulic chamber communicating with the wheel cylinders of a motor vehicle, said fluid displacing unit comprising a body and a reaction member carried thereby and axially movable relative to said body, said reaction member having one end exposed to said hydraulic chamber to be moved by pressure therein, a fluid pressure motor arranged at said end of said cylinder and comprisnig a pressure responsive unit, a variable pressure chamber and a valve mechanism controlling communication between said variable pressure chamber and sources of relatively high and low pressures and normally connecting said variable pressure chamber to said low pressure source, an axially movable sleeve slidable through said end wall and having one end connected to said pressure responsive unit and having its other end projecting through and beyond said body and connected thereto, a plate surrounding said projecting end of said sleeve and engaging said reaction member, spring means connected between said projecting end of said sleeve and said plate to bias the latter toward said body to tend to hold said reaction member in a normal position, a rod slidable through said sleeve and engaging at one end against said valve mechanism, a control piston slidable in the other end of said cylinder and engaging the other end of said rod to effect movement thereof to operate said valve mechanism to actuate said motor, and a pedal operable rod engaging said control piston and projecting from said other end of said cylinder, said control piston having a projecting portion spaced from said plate when said reaction member is in said normal position and engageable by said plate when an increase in pressure in said hydraulic chamber effects movement of said reaction member from its normal position, to oppose valve operating movement of said control piston.

8. A mechanism according to claim 7 provided with a seal in said hydraulic chamber in slidable engagement with said sleeve and with said cylinder and engaging said body and said reaction member and deformable by pressure in said hydraulic chamber to effect movement of said reaction member from its normal position to engage said plate with said control piston.

9. A booster brake mechanism comprising a main body having a cylinder provided adjacent one end with a bearing wall, a fluid displacing unit slidable in said cylinder and forming with said cylinder and with said bearing wall a hydraulic chamber communicating with the wheel cylinders of a motor vehicle, a sleeve slidable through said bearing wall and having one end portion connected to said fluid displacing unit, a fluid pressure motor adjacent said one end of said cylinder, said motor comprising a body portion connected to the adjacent end of said sleeve, a diaphragm connected between said body portion and said main body and forming therewith a variable pressure motor chamber, a valve mechanism carried by said body portion and controlling communication between said variable pressure chamber and sources of relatively high and low pressures and normally connecting said variable pressure chamber to said low pressure source, said body portion being radially spaced from said main body and being connected thereto solely by said diaphragm whereby said body portion is wholly supported by said sleeve, a rod projecting through said sleeve and engaging at one end against said valve mechanism to operate it and connect said variable pressure chamber to said high pressure source, and pedal operable means engaging the other end of said rod to move the latter, said fluid displacing unit comprising a portion connected to said sleeve and a relatively axially movable portion carried by said last-named portion and having one end exposed to pressure in said hydraulic chamber, and means mechanically connected to and biasing said relatively movable portion toward said hydraulic chamber to a normal position, said pedal operable means having a portion slightly spaced from said relatively movable portion to be engaged thereby when said relatively movable portion is moved against its biasing means upon a predetermined increase in pressure in said hydraulic chamber.

10. A mechanism according to claim 9 provided with a seal in said hydraulic chamber surrounding said sleeve and slidable in said cylinder and engaging both portions of said fluid displacing unit, said seal being deformable upon said predetermined increase in pressure in said hydraulic chamber to move said relatively movable portion of said fluid displacing unit from said normal position.

11. A booster brake mechanism comprising a cylinder, a fluid displacing unit therein, a fluid pressure motor at one end of said cylinder having a pressure responsive unit therein defining therewith a variable pressure chamber adjacent said end of said cylinder, and a valve mechanism controlling communication between said variable pressure chamber and sources of relatively high and low pressures and normally connecting said chamber to said source of low pressure, a reciprocating member connected between said pressure responsive unit and said fluid displacing unit, a wall adjacent said end of said cylinder through which said member is slidable, said cylinder between said fluid displacing unit and said wall forming a hydraulic chamber communicating with the wheel cylinders of a motor vehicle, a valve operating member at the other end of said cylinder connected to said valve mechanism to operate it and connect said variable pressure chamber to said high pressure source to move said fluid displacing unit in one direction toward said wall to displace fluid from said hydraulic chamber, said valve operating member being movable in said direction to operate said valve mechanism, and reaction means carried by said fluid displacing unit and exposed to hydraulic pressures in said hydraulic chamber and engageable with said valve operating member to resist valve operating movement thereof when pressure in said hydraulic chamber increases to a predetermined point.

12. A mechanism according to claim 11 wherein said valve mechanism is carried by said pressure responsive unit.

13. A mechanism according to claim 11 wherein said valve mechanism is carried by said pressure responsive unit, said reciprocating member comprising a tubular member, and a valve operating rod projecting entirely through said tubular member and engaging at one end against said valve operating member and at its other end against said valve mechanism.

14. A mechanism according to claim 11 wherein said valve operating member comprises a control piston slidable in the other end of said cylinder and a pedal operable rod engaging said control piston, said reciprocating member comprising a tubular member, and a rod projecting through said tubular member and engaging at one end with said control piston and at its other end with said valve mechanism.

References Cited in the file of this patent

UNITED STATES PATENTS

| | | |
|---|---|---|
| 2,685,171 | Price | Aug. 3, 1954 |
| 2,735,268 | Stelzer | Feb. 21, 1956 |
| 2,811,836 | Ayers | Nov. 5, 1957 |
| 2,812,639 | Whitten | Nov. 12, 1957 |

FOREIGN PATENTS

| | | |
|---|---|---|
| 685,339 | Great Britain | Dec. 31, 1952 |